(12) United States Patent
Chandler

(10) Patent No.: US 7,123,908 B2
(45) Date of Patent: Oct. 17, 2006

(54) ROUTING ALGORITHM FOR DISTRIBUTED TELECOMMUNICATION NETWORKS

(76) Inventor: Stephen Anthony Gerard Chandler, Rodborough Radio Technology, Suite 15, Bath Road Trade Estate, Lightpill, Stroud (GB) GL5 3QF ( * ) Notice: Subject to any disclaimer, the term of this patent is extended or adjusted under 35 U.S.C. 154(b) by 655 days.

(21) Appl. No.: 10/416,960

(22) PCT Filed: Nov. 21, 2001

(86) PCT No.: PCT/GB01/05140

§ 371 (c)(1),
(2), (4) Date: May 16, 2003

(87) PCT Pub. No.: WO02/45444

PCT Pub. Date: Jun. 6, 2002

(65) Prior Publication Data

US 2004/0029528 A1 Feb. 12, 2004

(30) Foreign Application Priority Data

Nov. 28, 2000 (GB) .................................. 0028951.2

(51) Int. Cl.
*H04Q 7/20* (2006.01)
(52) U.S. Cl. ...................... 455/428; 455/12.1; 370/238
(58) Field of Classification Search ................ 455/428, 455/12.1, 452.2, 513, 67.11, 69, 500, 554.1, 455/445; 370/238, 400, 237, 252, 255, 392
See application file for complete search history.

(56) References Cited

U.S. PATENT DOCUMENTS 6,055,429 A    4/2000  Lynch 6,810,428 B1 *  10/2004  Larsen et al. ................ 709/238
6,965,568 B1 *  11/2005  Larsen ........................ 370/238

FOREIGN PATENT DOCUMENTS

| GB | 2 305 823 | 4/1997 |
| GB | 2 318 254 | 4/1998 |
| GB | 2 342 543 | 4/2000 |
| WO | WO 97 13333 | 4/1997 |
| WO | WO 99 05829 | 2/1999 |

OTHER PUBLICATIONS

M.S. Corson et al.: "A Distributed Routing Algorithm for Mobile Wireless Networks" Wireless Networks, vol. 1, No. 1, Feb. 1995, pp. 61-81, XP000503721 ISSN: 1022-0038.
C E Perkins et al.: "Ad-Hoc On-Demand Distance Vector Routing" Proceedings of the 2nd IEEE Workshop on Mobile Computing Systems and Applciations (WMCSA '99), New Orleans, LA, USA, Feb. 25-26, 1999, pp. 90-100, XP002173721.
R Dube et al.: "Signal Stability-Based Adaptive Routing (SSA) for Ad Hoc Mobile Networks" IEEE Personal Communications. vol. 4, No. 1, Feb. 1997, pp. 36-45, XP000679252, ISSN: 1070-9916.

* cited by examiner

*Primary Examiner*—Melur Ramakrishnaiah
(74) *Attorney, Agent, or Firm*—Young & Thompson

(57) ABSTRACT

In a telecommunication network a plurality of transmitting and receiving stations are provided at randomly distributed locations. Routing elements are provided for routing of calls between stations in the network utilizing other stations in the network for relaying of such calls where necessary. Each station incorporates a call routing control unit acting to select a further station to which a call is to be transmitted for the purpose of relaying the call and comprising a memory for compiling, for a plurality of possible destination stations and from information received from further stations within the network within range of the transmitting station, information on possible further stations which may be suitable for relaying calls to the destination stations.

10 Claims, 6 Drawing Sheets

Figure 6

Nosey Neighbour Table (NNT)

| Station | Signal Strength | Time last heard | Activity |
|---|---|---|---|
|  |  |  |  |
|  |  |  |  |
|  |  |  |  |

Marco Polo Routing Table (MPT)

| Destination | Relay 1 | cost of relay 1 | Relay 2 | cost of relay 2 | Relay 3 | cost of relay 3 |
|---|---|---|---|---|---|---|
|  |  |  |  |  |  |  |
|  |  |  |  |  |  |  |
|  |  |  |  |  |  |  |

ROUTING ALGORITHM FOR DISTRIBUTED TELECOMMUNICATION NETWORKS

This invention relates to distributed telecommunication networks, and is concerned more particularly with the routing of signals through such distributed telecommunication networks.

The invention may be applied to transmitting and receiving stations for radio networks in which a plurality of such stations are provided at randomly distributed locations and in which circuit or packet switching is implemented by the stations themselves by means of routing of calls between stations in the network utilising other stations in the network for relaying of such calls where necessary.

It may also be used in connection with internet routing in which a plurality of routers, bridges and gateways perform a similar function of relaying packets of information.

In many countries, although there may be a telephone service to towns and some principal villages, the majority of the population has no effective access to telephones. There is a need in such countries for a network of telephones at such a density that substantially the whole of the population lives no more than a few kilometers from a public telephone. However this would require installation of a network comprising a large number of widely spaced telephones which would be prohibitively expensive if a conventional wired telephone system is used. The paper "A Distributed Rural Radio System for Developing Countries", S. A. G. Chandler, S. J. Braithwaite, H. R. Mgombelo et al., Fourth IEE Conference on Telecommunications, IEE Conference Publication No. 371, April 1993 describes a rural radio telephony system which, by virtue of its exchangeless network structure, is ideally suited to providing a basic telephone service to widely separated sites.

Such a radio telephony system uses a network of cooperating radio nodes which do not require a central exchange or interconnecting infrastructure. Each node consists of a transmitting and receiving station comprising two single channel digital transceivers, at least one telephone interface and controllers containing software implementing a protocol to effect the required communication control. The links between nodes are fixed capacity links (as opposed to packet switched or statistically multiplexed links) as required for duplex speech in telephone traffic. Each transmitting and receiving station comprises a solar powered digital radio unit with one or more telephones connected to it. Calls within a reasonable range (50 kilometers or so in reasonably favourable terrain) are made by direct station-to-station communication. Beyond this range, however, calls must be relayed by other stations within the network which are not being used at the time for making calls. Calls outside the area served by the network, or requiring an excessive number of relay hops, may be routed through gateway nodes into the public service telephone network.

International Published Patent Application No. WO 97/13333 discloses a radio telephony system in which each transmitting and receiving station incorporates a call routing control unit acting to select a further station to which a call from a source station to a destination station is to be transmitted for the purpose of relaying the call. The call routing control unit transmits an interrogation signal to be received by other stations in the network within range of the transmitting station, and the call routing control unit of each of the other stations transmits an acknowledgement signal when the station is available for relaying a call in response to the received interrogation signal, the acknowledgement signal being transmitted after a delay which is indicative of the suitability of the station for relaying the call towards its intended destination. The call routing control unit of the transmitting station then selects a station for relaying the call on the basis of receipt of an acknowledgement signal from the station after the least delay. Reference is also made in this regard to the paper "Analysis and Simulation of a Distributed Rural Radiotelephone Network", S. A. G. Chandler and J. Ni, Fourth European Conference on Radio Relay System, 11–14 Oct. 1993, Conference Publication No. 386.

The paper "A Distributed Routing Algorithm for Mobile Wireless Networks", M. S. Corson and A. Ephremides, Wireless Networks, Vol. 1, No. 1, February 1995, pages 61–81, XP000503721 discloses a distributed routing protocol for mobile packet radio networks address using next relay routing tables. This protocol uses forward flooding and a reverse "directed" reverse flooding to make and update the routing tables. This is similar to the forward and reverse flooding used in the algorithm of the preferred embodiment of the present invention described below, to establish a route when all else fails, and similarly enables a route to be found if one exists. However, whereas the potential routes are found in the Corson et al protocol by the forward flooding (QRY) and the reverse directed flooding (RPY) used to communicate the routing station entries back to some of the potential relay stations, forward flooding is used in the algorithm of the preferred embodiment of the present invention only to initially contact the destination station which then sends the routing table entries to all the nodes in the network.

The claimed reduction in unnecessary control overheads of this paper is valid only for routing between a particular pair of nodes. By contrast the algorithm of the preferred embodiment of the present invention described below gives much better performance for a whole network in the normal situation in which most nodes should be capable of communicating with many other nodes (as is the whole purpose of such ad-hoc networks), as routing attempts will set entries in the tables for all nodes (which hear these routine attempts) to reach the node initiating the routing attempt. This requires no extra routing table updating transmissions.

Unlike the algorithm of Corson et al, the majority of the routing table updates in the algorithm of the preferred embodiment of the present invention are performed by routing attempts from the destination which do not involve any flooding, such as simply using the Marco Polo routing tables referred to below, using direct routing, or a random choice for a hop for which there is no routing table entry. Such routing attempts need not be optimal or even successful in order to contribute to the updating of the routing table entries to reach the destination. The Corson et al algorithm is therefore much less efficient than the algorithm of the preferred embodiment of the present invention.

The algorithm of Corson et al also gives no indication of the optimal choice of next relay. By contrast, the algorithm of the preferred embodiment of the present invention inherently tends to optimal routine table values for static networks, thereby ensuring loop-free operation. The problem of disseminating back the information mentioned above does not arise with this algorithm.

The paper "Ad-hoc On-demand Distance Vector Routing", C. E. Perkins and E. M. Royer, Proceedings of the $2^{nd}$ IEEE Workshop on Mobile Computing Systems and Applications (WMCSA '99), New Orleans, 25–26, Feb. 1999, pages 90–100, XP002173721 discloses an algorithm which effectively corresponds to a slightly convoluted and complex version of flood routing to establish routes which are remembered only by those nodes involved in the route.

Nodes that do not lie on active paths neither maintain any routing information nor participate in any periodic routing table exchanges. This algorithm therefore specifically excludes the overhearing, sharing and re-using of routing information that forms the basis of the algorithm of the preferred embodiment of the present invention.

The complexity of the algorithm of this paper arises, as with the Corson et al algorithm, from the use of forward routing attempts to update routing table information. This algorithm offers no advance over the Corson et al algorithm apart from the inclusion of a hop count in the RREQ packets, though the use of source sequence and destination sequence numbers is only required because of the convoluted approach.

The paper "Signal Stability-Based Adaptive Routing (SSA) for Ad-hoc Mobile Networks", R. Dube et al, IEEE Personal Communications, Vol. 4, No. 1, February 1997, pages 36–45, XP000679252 (SSA) discloses a similar type of algorithm, but addresses the issue of reducing the routing table update rate required and describes a method of biasing the choice of routes towards those with the strongest and most stable signal paths. However this will tend to select routes with more relay hops and, although individual links will change less often, requiring less updating traffic, the spectrum usage due to the larger number of relays is likely to outweigh any such benefits. Also multi-hop connections will be likely to fail more often because of the larger number of hops.

It is an object of the invention to provide an improved routing algorithm for distributed telecommunication networks such as are described above.

According to the present invention there is provided a transmitting and receiving station for a telecommunication network in which a plurality of such stations are to be provided at randomly distributed locations and in which routing means are provided for routing of call setup information between stations in the network utilising other stations in the network acting as relay stations for relaying of such call setup information where necessary, which station incorporates call routing control means acting to select a relay station to which call setup information is to be transmitted for the purpose of relaying call setup information to a required destination station and comprising:

(a) memory means for storing, for a plurality of possible destination stations and from network status signals received from further stations within the network, the cumulative cost associated with the notional use of possible relay stations for relaying call setup information to the destination stations;

(b) compiling means for compiling in the memory means the cumulative cost associated with the notional use of possible relay stations for relaying call setup information to the destination stations, the compiling means being adapted to update the cumulative cost associated with the relay stations in the memory means in dependence on network status signals originating from the destination stations and relayed by relay stations to other stations in the network;

(c) overhearing means for receiving a network status signal transmitted by a further station in the network within range, whether or not the station is the intended recipient of call setup information transmitted by said further station, said network status signal being indicative of the cost of routing information to a source station from which the call setup information originates, being the sum of the cost information received from the previous relay station (where said further station is not the source station) and some incremental cost, together with the identities of said further station and the source station;

(d) transmission means for transmitting call setup information to at least one recipient station in the network within range and for additionally transmitting a network status signal;

(e) reception means for receiving call setup information from the transmission means of at least one further station in the network within range; and (f) station selection means for selecting a relay station for relaying call setup information to a destination station on the basis of receipt of a signal providing acknowledgement of the acceptance of the request from a station judged by the memory means to be suitable for relaying call setup information to the destination station.

Such a method is capable of finding a route between nodes if one exists with extremely high probability, and will do so quickly and with a very low information exchange requirement.

It should be appreciated that the term "cost" used above and elsewhere in this specification denotes any cumulative quantity resulting from possible routing of the signal through the network and which it is intended to minimise during such routing, such as, for example, the number of hops between stations undergone by the signal during such routing, the cumulative delay of the signal during such routing, or the cumulative error rate during such routing.

Preferably the call routing control means incorporates precedence means for establishing a precedence amongst the further stations judged, at least in part by the memory means from cost information received from the further stations relating to the destination station, to be suitable for relaying call setup information to the destination station, the station selection means being adapted to preferentially select as the station for relaying the call setup information the station of the highest precedence which is available for relaying the call setup information. Most preferably the precedence means is adapted to establish precedence at least partly on the basis of minimising a cost, such as the number of stations involved in relaying the call setup information to the destination station. Such cost may be evaluated as the, possibly time weighted, minimum of all such cost figures received from relay stations as a field within packets originating from the destination station during previous messages or calls. The values in the cost field within packets are cumulative values that increase when a packet is relayed by a constant (without loss of generality unity) amount or a variable amount dependant on such factors as congestion or delay. Should a constant amount be used, this would define the cost to be minimised as the number of stations involved in relaying the call setup information to the destination station.

The cost may be determined at least partly on the basis of the signal traffic congestion at the station in question. Furthermore the cost may be determined at least partly on the basis of the likely delay through the station.

In order that the invention may be more fully understood, embodiments of the invention will now be described, by way of example, with reference to the accompanying drawings, in which:

FIGS. 3, 4, 5, 6, 7, 8 and 9 are explanatory diagrams illustrating methods of call routing in such a network.

Figure 1:
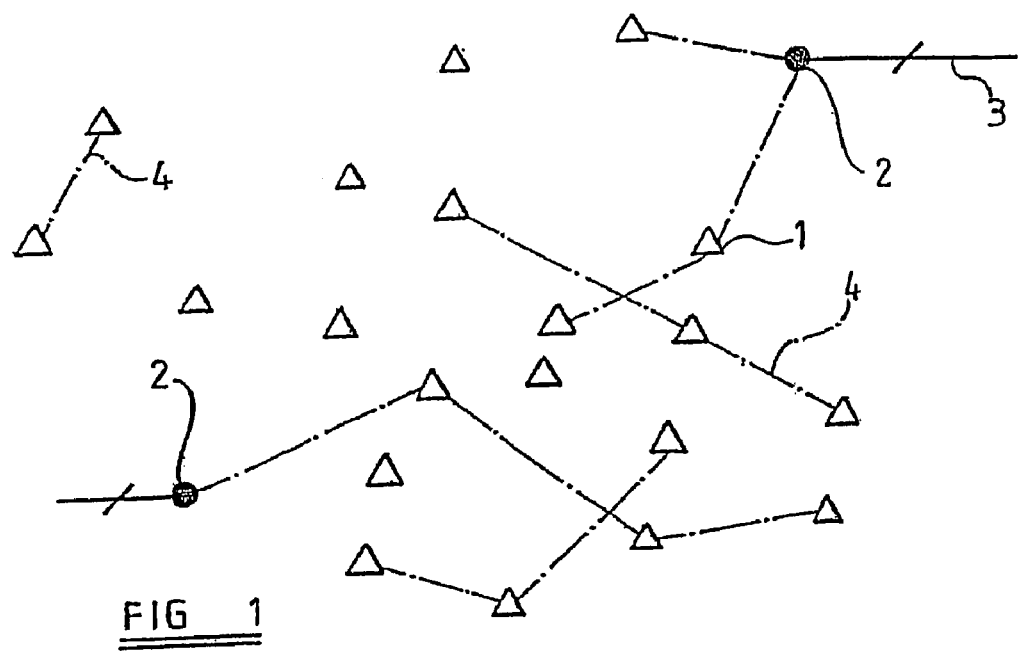
FIG. 1 is an explanatory diagram of a distributed circuit switched telecommunication network.

FIG. 1 is a diagram showing the location of nodes in a hypothetical distributed circuit switched radio telecommunication network comprises a series of randomly located fixed nodes 1 at which transmitting and receiving stations are located. In addition to the network nodes 1, several gateway nodes 2 are shown providing call access to the public service telephone network 3 in which telecommunication takes places in conventional manner by way of wired links under centralised exchange control. As indicated by broken lines 4 in the figure, calls may be made between network nodes 1, or between a network node 1 and a gateway node 2, either directly when the nodes are close enough to one another, or by way of other nodes 1 which serve to relay the calls.

Figure 2:
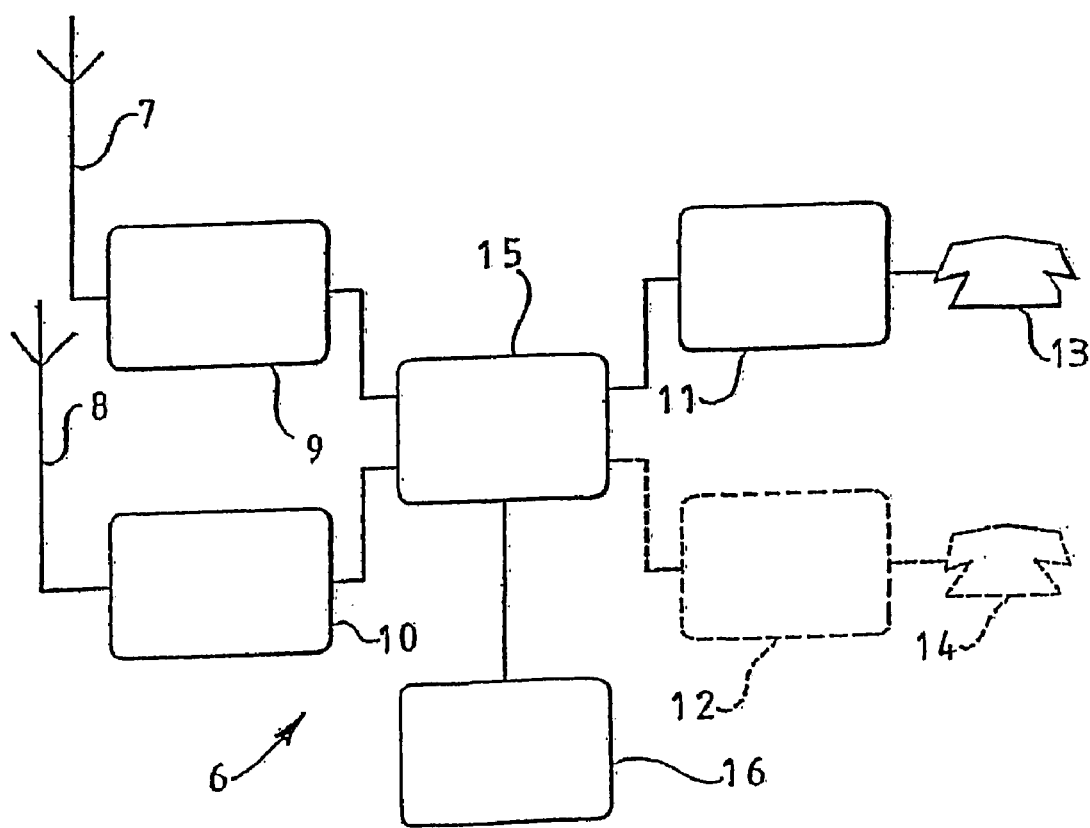
FIG. 2 is a block diagram of a transmitting and receiving station in such a network.

FIG. 2 is a block diagram of a transmitting and receiving station 6 comprising two transmit/receive aerials 7, 8, two single channel digital transceivers 9, 10, at least one telephone interface 11, 12 and associated telephone 13, 14, a transceiver interface 15 and a control unit 16 for effecting control of communication between stations within the network. Each station 6 can be used to terminate up to two calls, that is two calls being made simultaneously using the telephones 13, 14, or alternatively to relay a single call by simultaneously using the two transceivers 9, 10, to receive and re-transmit the call information in the two directions. Transceivers 9, 10 typically use separate frequency channels, although, in a small enough area for time skewing not to be problematic, time division multiplex could be used. Typically the two channels are selected from a set of two hundred available channels although larger numbers of channels could be used in certain situations.

The routing of a call from a source station S at which the call is made to a destination D to which the call is directed is controlled by an appropriate routing algorithm implemented by cooperation between the control units of the source and destination stations and any other stations used for relaying the call, utilising routing packets transmitted between the stations. The routing algorithm establishes a series of communication links starting from the source station S and terminating at the destination station D and utilising an iterative process if the destination station D is not within single hop range of the source station S.

In abstract terms, the routing problem may be described by a directed graph whose nodes are the stations in the network, with the arcs connecting them having associated costs or metrics. The problem is to find the route from source to destination incurring the lowest cost following the direction of the arcs or some heuristic approximation to it. If there always exists an arc from node y to node x if one exists from x to y and if the associated costs are equal, the network is reciprocal, and may be represented by a non-directed graph. This would be the case for the radio system described if the cost to be minimised were the number of hops, which would make the arc costs all unity.

Figure 3:
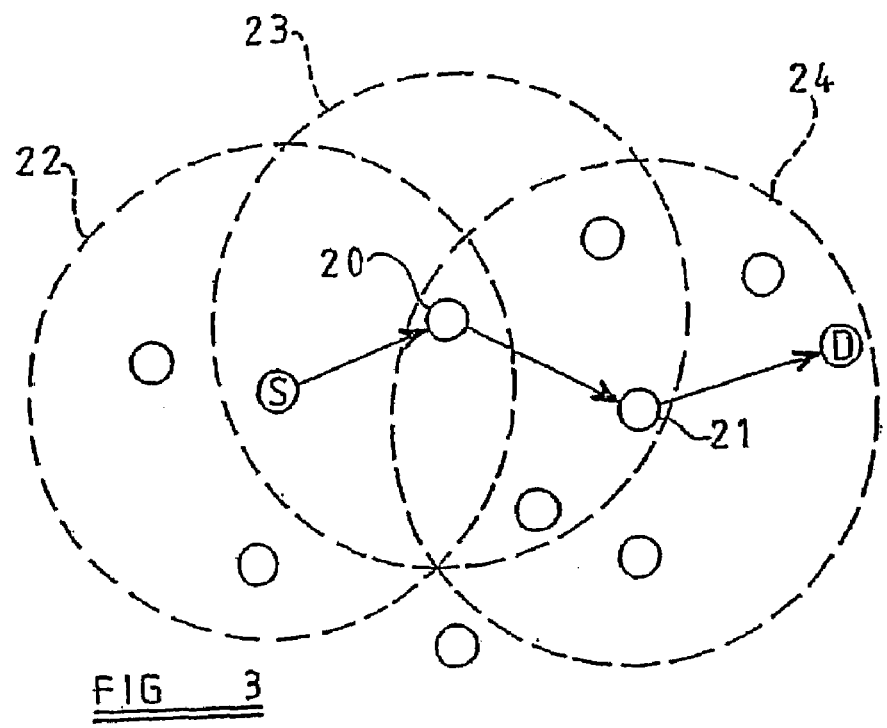

A simple known heuristic method of such routing, illustrated in FIG. 3, involves determining at each stage of the iteration that station within radio range of the previous station that is nearest to the destination station D. If the nearest station is no nearer than the previous station utilised in the routing, then the route is blocked. This known method, which may be termed direct routing, is shown in the figure relaying a call by way of two intermediate stations 20 and 21, the radio ranges associated with the source station S and the stations 20 and 21 being shown by the broken circles 22, 23 and 24.

Although there are other methods of implementing the direct routing algorithm, as will be described later, the manner in which this routing algorithm has been previously implemented by the routing control unit of each station in this prior art method will now be described. The control unit of the previous station will broadcast an interrogation signal in the form of a CQL message that will be received by all of the stations available for relaying within range. If this interrogation signal is received by the destination station D, the control unit of the destination station provides an immediate acknowledgement signal to indicate that the call may be relayed from the previous station directly to the destination station. Other stations receiving the interrogation signal provide an acknowledgement signal that is transmitted after a delay which increases with the distance of the station from the destination station D. The amount of this delay is calculated by each station on the basis of the distance of the station from the destination station D determined either from a list of the locations of other stations stored within the station. As soon as the previous station receives an acknowledgement signal from another station, it sends a confirmation signal to the selected station. Other stations within range, but at a greater distance from the destination station D (providing a greater delay before acknowledgement), will also receive the confirmation signal and will thereby be inhibited from acknowledging the interrogation signal, thus preventing unnecessary congestion on the calling channel.

Figure 4:
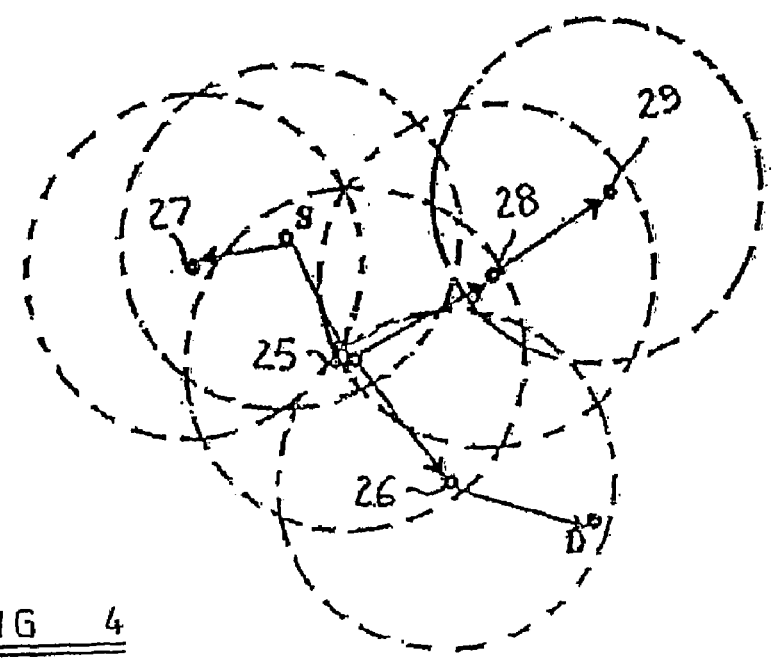

Another method of routing, shown in FIG. 4, may be termed flood routing and also uses an iterative process. In this case the control unit of the source station S will broadcast an interrogation signal in the form of a CQF message which will be received by all of the stations available for relaying within range, and each receiving station will record the identity of the transmitting station and will itself broadcast an interrogation signal in the form of a CQF message containing its own identity as well as the identities of the source and destination stations and the cumulative cost of the route so far. Strictly, in a non-reciprocal network, the cost added for each step of routing from x to y should be the cost back from y to x. In the case of non-reciprocal connectivity, i.e. having an arc from x to y but none in the reverse direction, so-called Marco Polo routing (to be described below) would never select such a route. In real networks this would only occur in the case of failure of a link in one direction. In that case there would be little to lose by avoiding the link completely. The iterative process of each station within range registering the CQF message (unless it has previously registered the message) and broadcasting its own interrogation signal will continue until an interrogation signal is received by the destination station D at which time the routing of the call between the source and destination stations will be completed utilising the links back to the preceding stations recorded by the stations along the route.

FIG. 4 shows this method applied to relay a call by way of two stations 25, 26, and shows also the receipt of an interrogation signal from the source station S by a further station 27, the receipt of an interrogation signal from the station 25 by a further station 28, and the receipt of an interrogation signal from the station 28 by a further station 29. The disadvantage of such flood routing is that all available stations within range will transmit CQF messages for each call resulting in congestion of the calling channel. In order to restrict the number of routing packets lost by collision, the rate of sending routing packets must be restricted which results in the method being slow to set up calls. If the cost is just the number of hops, it is possible to allow sufficient time for each hop of the flood to be completed before the next starts. With other cost functions allowance must be made for nodes to re-send their CQF messages if their cost is reduced by receiving a CQF message with a lower value than that on which its own CQF message was based. However the method has the theoretical advantage of being an implementation of the Bellman Ford Moore algorithm to find the lowest cost route, in this case the route with the minimum number of hops. As such it will not miss any possible route, unless the calling channel congestion is so high that routing packets are lost. Even if such congestion occurs, it is most improbable that a route will not be found (although the route found may be slightly longer than need be), as this is only likely to happen in very sparse networks in which call channel traffic is very low.

Figure 5:
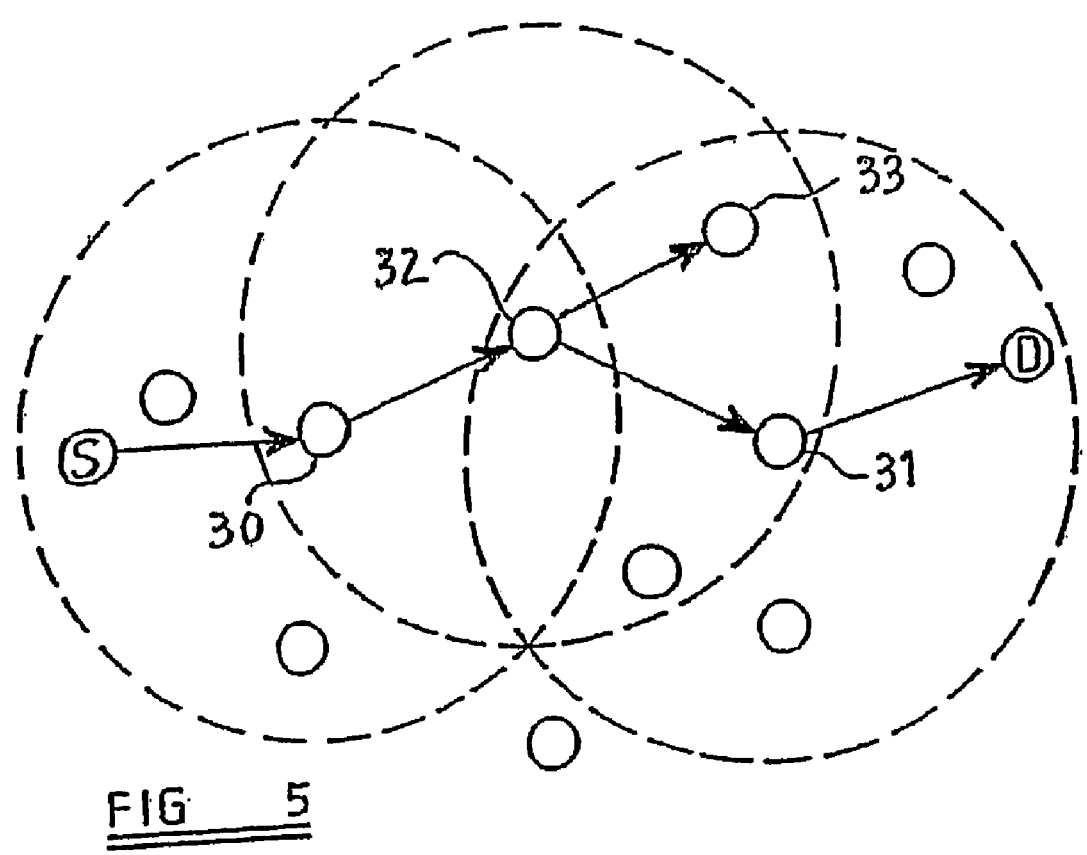

In another method of routing, shown in FIG. 5, for which we may coin the term Marco Polo routing, the stations within the network record in their memories an ordered list of stations (the Marco Polo routing table) which may be used as the next relay station in calls to each other station in the network. (The expression refers to the fact that the mediaeval explorer is supposed to have found his way to China by relying on reports from those travelling from that country.) This list is not a static routing table, but is generated and constantly updated by the station overhearing routing or other signals relayed by stations from source stations to destination stations. The station is entered in the Marco Polo routing table as a choice to relay calls to the source station of the overheard signal, if it has a lower cumulative cost than existing entries in the table. Thus, whatever the method of routing the overheard call, the Marco Polo method will tend to the minimum cost one but, unlike flood routing, it is not guaranteed to search all possible routes and so could theoretically become locked into a route which is only locally optimal. However this is unlikely to have a significant effect on performance, as any routing failure will result in flood routing being invoked.

The choice of cost function is likely to be minimisation of the number of hops required in routing the call from the source station S (which would be the number of hops in routing the call to the destination station when using Marco Polo routing) but could be on the basis of some other factor, such as the least total delay likely to be encountered in making a call by way of that station, the error rate over the link or some measure of the degree of congestion. The judgement may be made on the basis of any one of these factors or other factors, or on the basis of several such factors in combination. Some of the information required to make this judgement, the cumulative cost from the source station S, must be transmitted within all routing packets (CQS, CQF and CQT).

Thus, referring to FIG. 5, the station 33 detects a routing packet transmitted by the station 32 indicating that it is attempting to set up a call in which the station 32 acts as a relay in transmitting the call from a station 30 to a station 31. As a result of such detection the station 33 makes an entry in its Marco Polo routing table to the effect that any call to station 30 can be efficiently routed through station 32. In this manner each station can build up a list of entries in its Marco Polo routing table indicating those stations within its range that can be used for relaying of calls' to other stations outside its range.

Figure 8:
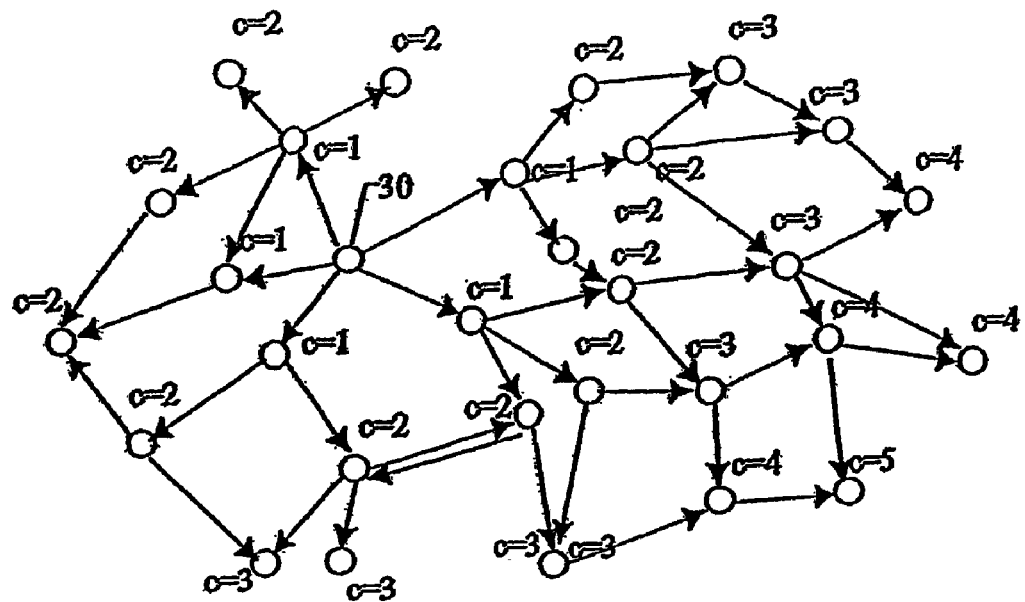
Figure 9:
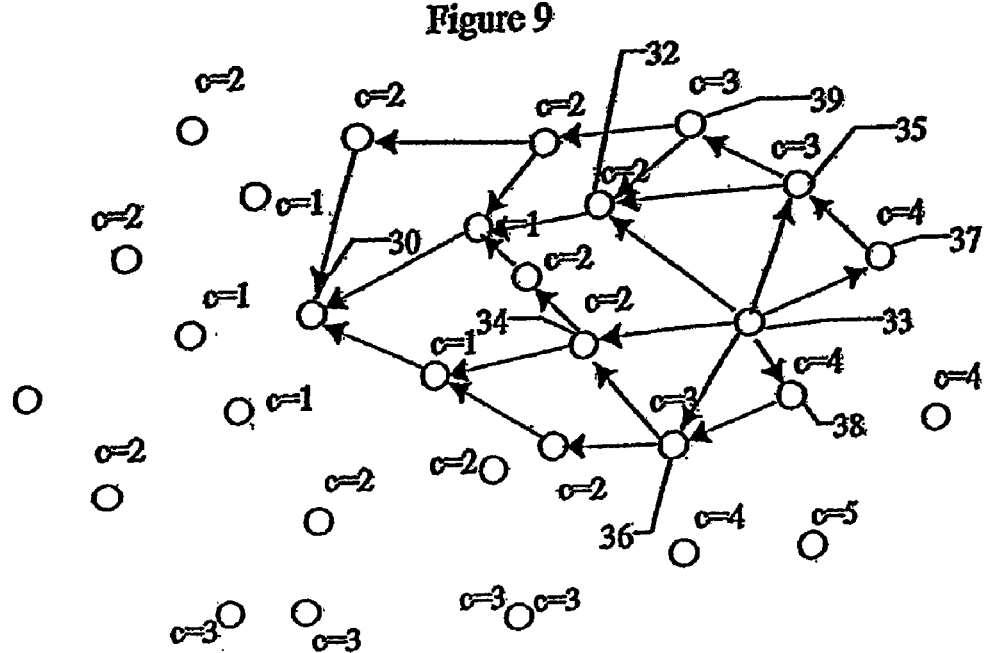

This is further illustrated in FIGS. 8 and 9. FIG. 8 shows the paths of a number of routing attempts from station 30 to third party destinations, using any routing means, whether or not successful. FIG. 9 shows a routing attempt from station 33 to station 30. The station 33 first tries station 32, and then stations 34, 35, 36, 37 and 38 in order. The routes that would be taken by Marco Polo routing from then onwards towards the station 30 are also shown. Also shown with a dashed arrow is another route that could be used if either more routes had been tried and stored in the Marco Polo table of the station 39 or if direct routing were used when routing from station 39 because all other routes from there were blocked.

None of the above described routing methods are satisfactory in all circumstances. For example, direct routing has the disadvantage that it is not possible to find all possible routes by this method, with the result that, if the routing reaches a dead end at which further routing is blocked, for example due to the presence of a topographical obstacle or simply due to the low density of nodes in a particular area, it can be difficult or impossible to locate an alternative route using this method. Furthermore any rerouting using a backtracking modification (such as is disclosed in WO 97/13333) may be slow (because of lack of time-slots) and subject to performance degradation on congested calling channels. Furthermore direct routing can fail completely if the location entry for a particular station in the directory of station locations has been entered erroneously. Flood routing causes congestion in busy networks, and Marco Polo routing relies on another routing algorithm to set up its tables. This routing algorithm does not necessarily have to be optimal, but the speed and efficiency of the updating of the Marco Polo routing table will be increased if it is. A good heuristic algorithm or even a completely random choice will suffice so long as it is sufficiently random not to exclude possible routes from its search.

Accordingly the proposed routing method utilises a combination of direct routing, flood routing and Marco Polo routing in combination as described below. It should be understood that, in a preferred implementation of this method, each station within the network incorporates a memory which is regularly updated with information concerning the other stations within the network within calling range, such as the activity state of the station (whether a call is being initiated or terminated or relayed), the agreed operational frequencies of the station when in burst mode, the signal strength of the station, etc. This information is collated by the station listening to information transmitted by the other station when setting up and clearing down calls (when the listening station is not itself involved in a call). The information is stored in a table NNT and is updated when necessary. The information in the table NNT may be made use of under various conditions, for example to inhibit calling of a station when it is apparent from the entries in the table NNT that the station is busy. Furthermore information in the table NNT may be used to initiate a special call interruption facility (as described in WO 97/13333 referred to above) permitting a call which is being relayed by the other station to be rerouted to enable that station to be used for a new call. Although there are some features in common the table NNT is distinct from the Marco Polo routing table described before. The table NNT has entries only for those stations that are within direct radio range of a station, whereas the Marco Polo routing table has entries for all stations on the network. All the entries in the Marco Polo routing table will contain numbers of stations within the table NNT. Although the Marco Polo routing table is necessary to implement the proposed routing method, the table NNT is only ever a feature to improve performance of the algorithm. Examples of these two tables are illustrated for comparison in FIG. 6.

In the proposed routing method, the flood and direct routing methods already described, as well as overheard third party Marco Polo routing packets, are used to compile, within each station memory, entries against each station in the Marco Polo routing table of possible routes which may be used for relaying a call to that station. The proposed method of implementing direct routing differs from that described for the existing, known prior art method as will be seen below. It should be noted that the use of direct routing is by no means mandatory. In some situations, such as where a directory containing locational information is not available, it may be replaced by other heuristic algorithms, or random choice, or removed to leave only flood routing, without affecting the viability of the approach. However this would affect the overall performance. It will be appreciated that, after a station has initially been commissioned and brought into use, the station will receive transmitted signals from other stations within range, and will gradually build up entries within the Marco Polo routing table as to which stations may be used for relaying calls to other stations within the network, until the table includes two or more entries against each station within a list of the stations within the network giving details of two or more alternative neighbouring stations which may be used for relaying a call to that station.

When a call is to be made from a source station S (or a station already selected for relaying a call from the source station S), incorporating such a compiled Marco Polo routing table in its memory, to a destination station D, a packet is first sent to the destination station D to see if it is within range, and, if the station is not fully engaged in relaying, initiating or terminating other calls (in which case it would not be listening on the calling channel), the routing will have succeeded and the destination station D will reply with a packet confirming this. However, if the destination station D is not within range, and it does not have an entry in the table NNT indicating that it is busy on another channel (which may permit interruption on that channel in some circumstances), routing proceeds by trying, in order, the entries in the Marco Polo routing table for the destination station D, as follows. Each entry in the table NNT is first checked for availability to relay the call. If the station is busy the next entry is tried. However, if the station is available for routing according to table NNT, the station is sent a packet to confirm that this is actually the case. If the station acknowledges affirmatively, the station is selected and routing continues from it.

Figure 7:
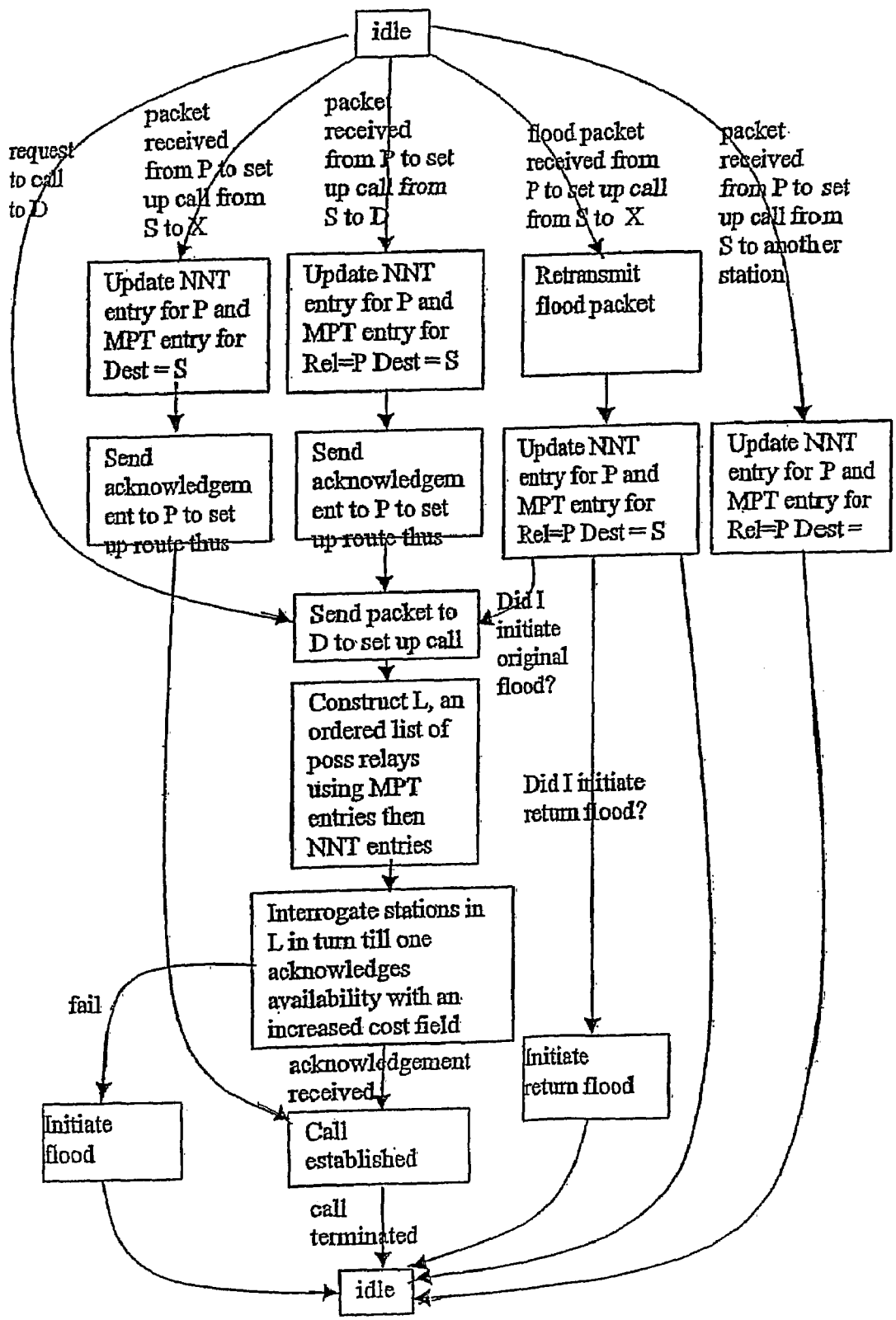

If all the entries in the Marco Polo routing table for the destination station D are tried without finding a station suitable for routing, further possible relay stations are tried according to the direct routing criterion using the same protocol as for Marco Polo routing. All suitable stations on the table NNT are put into an ordered list based on the criterion of their distance from the destination D, using location information in the directory. These are then tried in that order using the same process as described above for the entries in the Marco Polo routing table. Only when all such stations have been tried unsuccessfully will the routing attempt using direct routing be abandoned. This will be communicated to the source station S, if this is not itself the station at which the routing failure has occurred, and flood routing from the source station S to the destination station D will then be initiated. If the delay is too long the call attempt which initiated the flood routing may fail, but the flood should continue so as to obtain the required routing. However, once the destination station D receives the flood routing signal, the destination station D then initiates flood routing back to the source station S. The purpose of this is as follows. Flood routing initiated by the source station S will ensure that there is a Marco Polo routing entry back to the source station S in every node involved in the flood routing. However the problem initiating the flood routing had arisen as a result of an attempt to route a call to the destination station D, and what is actually needed is for every node on the network to have a Marco Polo routing entry leading to the destination station D, and not the source station S. The reverse flood routing will achieve just this. Routing back to the source station S for the call could be performed using Marco Polo routing from the destination station D, but in that case the flood routing back to the source station S would have to be scheduled for after the call in question. Reverse flood routing in response to the original flood routing would be simpler and more regular. A simplified state transition diagram of a preferred implementation of the software to implement this process is shown in FIG. 7.

It has been found that the proposed routing method provides greatly improved performance and reliability over a wide range of network topologies and over a wide range of topographies. It does not rely solely on flood routing which would otherwise cause congestion on the calling channel, and it does not suffer from the serious disadvantage of the use of direct routing alone by which routing of a call may be blocked in the event of a dead end being encountered, for example due to the presence of a topographical obstacle.

Although the above description has been mainly concerned with radio network routing, the system of the invention could also be used for routing packets on data networks. The main differences between such a routing system and the systems already described above are (i) that there is no scope for using overheard signals as a data network router will only be able to monitor information actually routed through it, and (ii) that there is little or no significance in geographical distance from destination as used in the direct routing component. The first difference will reduce the rate of update of the Marco Polo tables. However in an IP datagram network, with only the addition of a cumulative metric field (and there is already a hop count if that were to be the metric) in IP packets, all packets could be used to provide updates. With regard to the second difference, as has been stated, direct routing is only selected as a good heuristic method. In a data network there would be no reason not to use a random choice instead.

The hierarchy of networks comprising the internet has the effect of limiting the complexity of networks: over which any routing algorithm is required to function, and this reduces the need for a routing algorithm with as much intelligence as the system described above.

The invention claimed is:

1. A transmitting and receiving station for a telecommunication network in which a plurality of such stations are to be provided at randomly distributed locations and in which routing means are provided for routing of call setup information between stations in the network utilising other stations in the network acting as relay stations for relaying of such call setup information where necessary, which station incorporates call routing control means acting to select a relay station to which call setup information is to be transmitted for the purpose of relaying call setup information to a required destination station and comprising:

(a) memory means for storing, for a plurality of possible destination stations and from network status signals received from further stations within the network, the cumulative cost associated with the notional use of possible relay stations for relaying call setup information to the destination stations;

(b) compiling means for compiling in the memory means the cumulative cost associated with the notional use of possible relay stations for relaying call setup information to the destination stations, the compiling means being adapted to update the cumulative cost associated with the relay stations in the memory means in dependence on network status signals originating from the destination stations and relayed by relay stations to other stations in the network;

(c) overhearing means for receiving a network status signal transmitted by a further station in the network within range, whether or not the station is the intended recipient of call setup information transmitted by said further station, said network status signal being indicative of the cost of routing information to a source station from which the call setup information originates, being the sum of the cost information received from the previous relay station (where said further station is not the source station) and some incremental cost, together with the identities of said further station and the source station;

(d) transmission means for transmitting call setup information to at least one recipient station in the network within range and for additionally transmitting a network status signal;

(e) reception means for receiving call setup information from the transmission means of at least one further station in the network within range; and (f) station selection means for selecting a relay station for relaying call setup information to a destination station on the basis of receipt of a signal providing acknowledgement of the acceptance of the request from a station judged by the memory means to be suitable for relaying call setup information to the destination station.

2. A station according to claim 1, wherein the call routing control means incorporates precedence means for establishing a precedence amongst the further stations judged, at least in part by the memory means from the cost information received from the further stations relaying to the destination station, to be suitable for relaying the call setup information to the destination station, the station selection means being adapted to preferentially select as the station for relaying the call setup information the station of the highest precedence which is available for relaying the call setup information.

3. A station according to claim 2, wherein the precedence means is adapted to establish precedence at least partly on the basis of minimising a cost, such as the number of stations involved in relaying the call setup information to the destination station,
the station, the station selection means being adapted to preferentially select as the station for relaying the call setup information the station at the least distance from the destination station.

4. A station according to claim 2, wherein the cost is determined at least partly on the basis of the signal traffic congestion at the station in question.

5. A station according to claim 2, wherein the cost is determined at least partly on the basis of the likely delay through the station.

6. A station according to claim 1, wherein the call routing control means incorporates direct routing means arranged to cause a routing signal to be transmitted to at least one further station within range in the event that none of the stations judged suitable by the memory means is available for relaying the call setup information to the destination station, enabling a routing signal to be transmitted back to the station, the station selection means being adapted to the preferentially select as the station for relaying the call setup information the station at the least distance from the destination station.

7. A station according to claim 1, wherein the call routing control means incorporates flood routing means arranged to cause a routing signal identifying the transmitting station to be transmitted to further stations within range in the event that none of the stations judged suitable by the memory means is available for relaying the call setup information to the destination station, receipt of the routing signals by the further stations in turn causing those stations to transmit further routing signals identifying the further stations which in turn may cause still further stations to transmit routing signals in an iterative process which eventually results in receipt of a routing signal by the destination station, enabling an acknowledgement signal to be transmitted back to the transmitting station giving the identities of a series of stations suitable for relaying the call setup information between the transmitting station and the destination station.

8. A station according to claim 1, wherein the memory means incorporates a table NNT containing information relating to the current activity states of further stations within range of the transmitting station and optionally also other parameters such as the operating frequencies and signal strengths of the further stations.

9. A station according to claim 1, which is adapted for routing data packets within a data network.

10. A data network incorporating stations according to claim 9 for routing data packets within the network.

* * * * *